United States Patent [19]

Blank

[11] Patent Number: 4,850,413
[45] Date of Patent: Jul. 25, 1989

[54] TIRE BEAD BREAKING TOOL

[76] Inventor: Paul C. Blank, Rt. 3, P.O. Box 283, Nashville, Ark. 71852

[21] Appl. No.: 290,507

[22] Filed: Dec. 27, 1988

[51] Int. Cl.⁴ .............................................. B60C 25/06
[52] U.S. Cl. ..................................... 157/1.17; 157/1.1
[58] Field of Search ....................... 157/1.1, 1.17, 1.26, 157/1.28

[56] References Cited

U.S. PATENT DOCUMENTS

| | | | |
|---|---|---|---|
| 1,475,518 | 11/1923 | Snider . | |
| 2,316,023 | 4/1943 | Sauer | 157/6 |
| 2,326,234 | 8/1943 | Leidel | 157/1.17 |
| 2,367,638 | 1/1945 | McCulloch | 157/6 |
| 2,652,103 | 9/1953 | Danroth et al. | 157/1.17 |
| 2,672,185 | 3/1954 | Bergeron | 157/1.26 |
| 3,693,692 | 9/1972 | Branick | 157/1.17 |
| 3,771,580 | 11/1973 | Branick | 157/1.17 |
| 3,847,197 | 11/1974 | Konen | 157/1.17 |
| 3,880,220 | 4/1975 | Bunts | 157/1.17 |
| 4,355,675 | 10/1982 | Freixinos | 157/1.17 |
| 4,524,813 | 6/1985 | Gering | 157/1.17 |

FOREIGN PATENT DOCUMENTS

| | | | |
|---|---|---|---|
| 13844 | 11/1977 | Australia | 157/1.17 |
| 595961 | 4/1960 | Canada | 157/1.17 |

Primary Examiner—James G. Smith
Attorney, Agent, or Firm—Dorr, Carson, Sloan & Peterson

[57] ABSTRACT

A tire bead breaking tool has a primary frame with a stem segment and a perpendicular retaining segment. A sliding member slides parallel to this stem segment. A threaded engagement bolt is used to adjust and secure the relative position of the sliding member with respect to the primary frame. A parallel arm is connected through a slot in the stem segment to the sliding member, and translates parallel to the stem segment as the position of the sliding member is adjusted by the engagement bolt. A second, hinged arm is pivotally attached to the end of the parallel arm distal from the cross segment. An actuating bolt is employed to pivot this hinged arm with respect to the parallel arm.

11 Claims, 7 Drawing Sheets

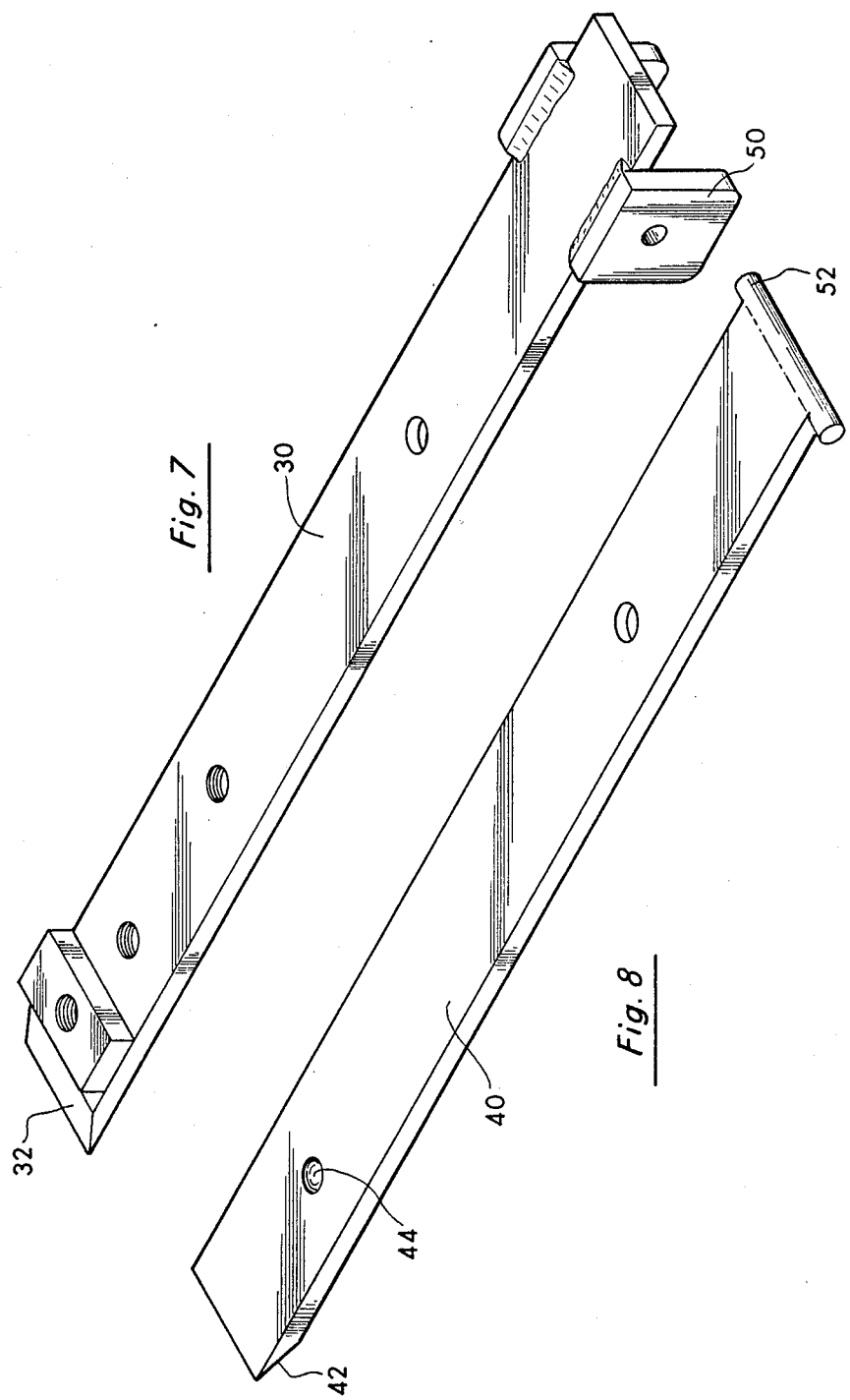

TIRE BEAD BREAKING TOOL

BACKGROUND OF THE INVENTION

1. Field of the Invention

The present invention relates generally to the field of devices used to remove a tire mounted on a wheel rim, and in particular to tools used to break the tire bead away from the flange of the wheel rim.

2. Statement of the Problem

Heretofore, a wide variety of devices have been used to remove a conventional automobile or truck tire from its rim. One approach is simply to apply a large force against one or more points of the side wall of the tire while supporting the opposite side wall and wheel rim, thereby causing the tire bead to break away from the wheel rim at the points where force is applied. This approach generally requires exertion of large forces on the side wall of the tire, and correspondingly large support forces on the opposite side of the tire and wheel rim.

A second approach is to insert a tool between the tire wall and wheel rim which simultaneously pushes against the tire wall and pulls back against the interior surface of the wheel rim along a relatively small section of the periphery of the tire. This approach is more readily adaptable to small hand tools. However, the tools disclosed in the prior art generally have one or more shortcomings in areas such as: (a) adaptability of the tool to a wide variety of modern wheel rims; (b) size and portability of the tool; (c) ease of use, particularly in regard to initial insertion of the tool between the tire wall and wheel rim; and (d) requirement of an external power source, such as compressed air, for operation of the tool.

A prior art search conducted by the inventor of the present invention disclosed a variety of devices for removing a tire from its rim. The most pertinent references uncovered in this search are as follows:

| Inventor | U.S. Pat. No. | Issue Date |
| --- | --- | --- |
| Snider | 1,475,518 | 11/27/23 |
| Sauer | 2,316,023 | 4/6/43 |
| McCulloch | 2,367,638 | 1/16/45 |
| Danroth, et al. | 2,652,103 | 9/15/53 |
| Bergeron | 2,672,185 | 3/16/54 |
| Branick | 3,693,692 | 9/26/72 |
| Branick | 3,771,580 | 11/13/73 |
| Konen | 3,847,197 | 11/12/74 |
| Bunts | 3,880,220 | 4/29/75 |
| Freixinos | 4,355,675 | 10/26/82 |

U.S. Pat. No. 2,316,023 issued to Sauer discloses a hand tool having a first arm 18 with a curved lower end that cams against a second wedge-shaped arm 17 to separate the tire from the wheel rim. A second embodiment is shown in FIGS. 7 through 14 having two parallel wedge-shaped arms 30 and 31. A lever mechanism slides the arm 31 downward with respect to arm 30, thereby separating the tire from the wheel rim.

U.S. Pat. No. 2,652,103 issued to Danroth et al., is perhaps the clearest example of a number of variations in which two wedge-shaped or claw-shaped members are initially inserted between the tire wall and the wheel rim. One of these members is then pushed forward with respect to the other member, causing the tire wall to separate from the wheel rim. Other examples of this general approach are disclosed by U.S. Pat. Nos. 3,693,692 and 3,771,580 to Branick; U.S. Pat. No. 4,355,675 to Freixinos; U.S. Pat. No. 2,367,638 to McCulloch; and U.S. Pat. No. 3,847,197 to Konen.

U.S. Pat. No. 2,672,185 to Bergeron, U.S. Pat. No. 1,475,518 to Snider, and U.S. Pat. No. 3,880,220 to Bunts are further general examples of tire bead loosening tools in which a lateral force is exerted on the tire wall to separate the tire from the wheel rim.

3. Solution to the Problem.

None of the prior art references uncovered in the search set forth the use of a simple, compact hand tool having the specific structure of the prevent invention which can be readily adapted for use with a wide variety of types of wheel rims; initially inserted between the tire and wheel rim with a minimum amount of difficulty; and manually operated without the need for an external power source.

SUMMARY OF THE INVENTION

This invention provides a tire bead breaking tool having a primary frame with a stem segment and a perpendicular retaining segment. A sliding member slides parallel to this stem segment. A threaded bolt is used to adjust and secure the relative position of the sliding member with respect to the primary frame. A parallel arm is connected through a slot in the item segment to the sliding member, and translates parallel to the stem segment as the position of the sliding member is adjusted by the adjustment bolt. A second, hinged arm is pivotally attached to the end of the parallel arm distal from the cross segment. A bolt is employed to pivot this hinged arm with respect to the parallel arm.

A principal object of the present invention is to provide a small, inexpensive, lightweight, and portable hand tool for removing a tire from a wheel rim. Another object of the present invention is to provide a hand tool that can be initially inserted between the tire and wheel rim with a minimum amount of difficulty. Yet another object of the present invention is to provide a tool that can be manually operated without the need of an external power source.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 7 is a perspective view of the parallel arm of the tool.

FIG. 8 is a perspective view of the hinged arm of the tool.

DETAILED DESCRIPTION OF THE INVENTION

Figure 1:
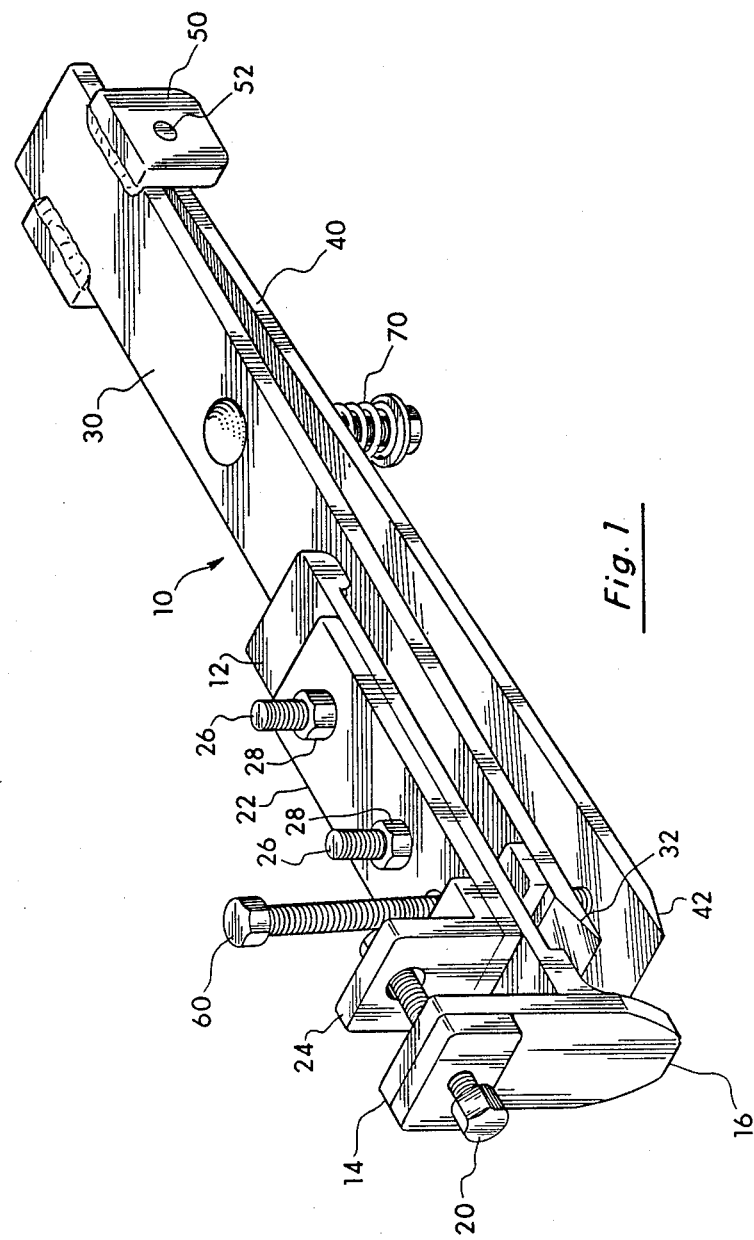
FIG. 1 is a perspective view of the tool.
Figure 2:
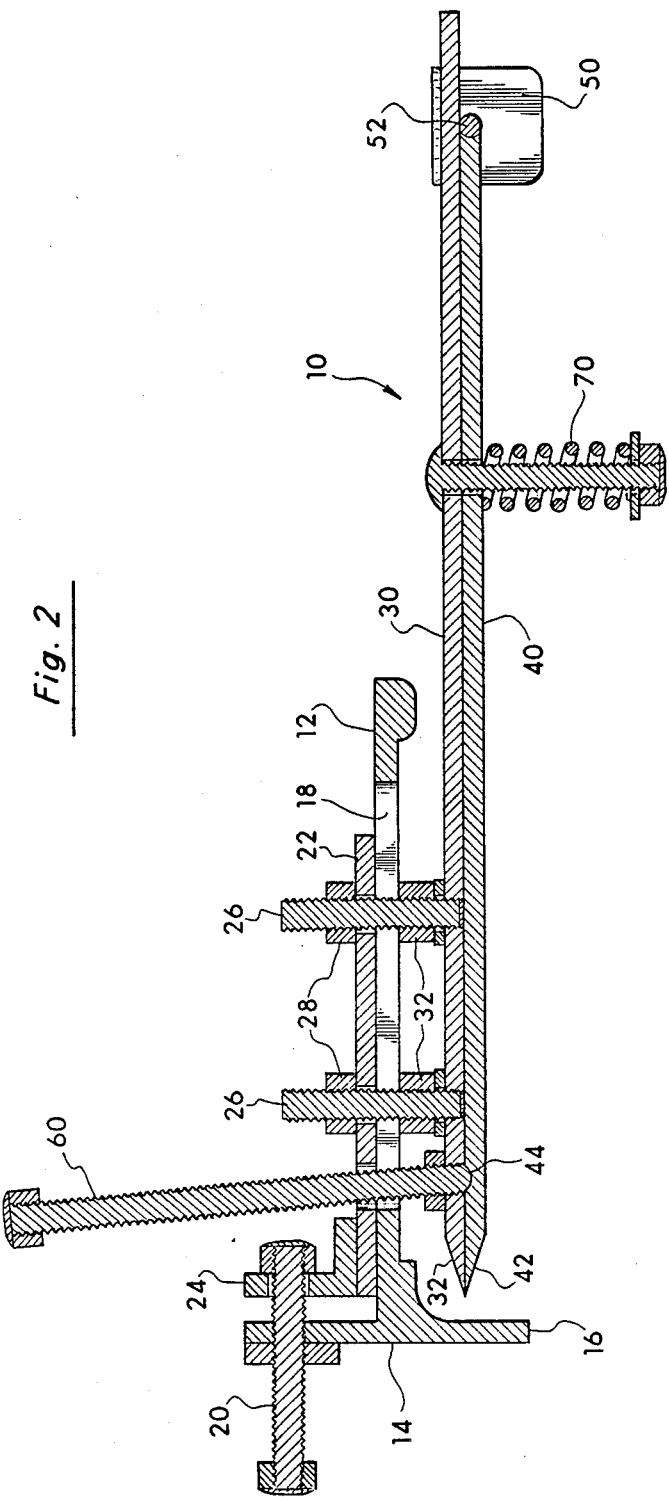
FIG. 2 is a side cross-sectional view of the tool.

Turning for FIG. 1, the entire tool 10 is shown in perspective view. The principal components are the frame 12, shown in greater detail in FIG. 6; the sliding member 22, shown in greater detail in FIG. 5; and two arms 30 and 40, shown in greater detail in FIGS. 7 and 8, respectively. FIG. 2 shows a side cross-sectional view of the tool 10 and these various components.

The frame 12 is generally T-shaped, with a stem segment and two cross segments 14 and 16 extending perpendicular to the stem segment. One of these cross segments 16, referred to as the retaining segment is used to retain the tool in place with respect to the wheel rim, as will be discussed later. The other cross segment 14, referred to as the engagement segment, is used in conjunction with a bolt 20 to adjust the location of the sliding member 22 with respect to the frame 12, as discussed below. A slot 18 is cut through the frame 12 in a direction parallel to the cross segments 14 and 16, and runs along a portion of the length of the stem segment.

The sliding member 22 is generally L-shaped. A small foot segment 24 extends upward from one end of the sliding member. As shown in FIGS. 1 through 4, the sliding member 22 is designed to slide along a portion of the length of the stem segment of the frame, on the side of the frame opposite from the retaining member 16. The relative position of the sliding member with respect to the frame is adjusted by means of a threaded bolt 20, or other engagement means, which extends through the foot 24 of the sliding member and the engagement segment 14 of the frame. By tightening or loosening this bolt 20, the spacing between the foot 24 and engagement segment 14 can be increased or decreased, thereby causing the sliding member 22 to slide with respect to the frame 12.

The upper arm 30, also referred to as the parallel arm, extends parallel to the stem segment of the frame 12. The parallel arm 30 is connected to the sliding member 22 by means of a number of connectors 26 extending between the parallel arm 30 and sliding member 22 through the slot 18 in the stem segment of the frame 12. These connectors cause the parallel arm to translate parallel to the stem segment of the frame as the position of the sliding member 22 is adjusted by the bolt 20. In the preferred embodiment, these connectors 26 are threaded bolts. A pair of nuts 28 and 32 on each bolt allow adjustment of the spacing between the frame 12 and the parallel arm to accommodate different types and sizes of wheel rims. The end of the parallel arm distal from the retailing member 16 is connected by means of a hinge 50 and 52 to a second, hinged arm 40. The hinged arm 40 rotates about the hinge with respect to the parallel arm 30 in a plane defined by the parallel arm and the stem segment of the frame 12. The ends 32 and 42 of the parallel arm 30 and the hinged arm 40 adjacent to the retaining member 16 are tapered to a point to facilitate initial insertion of the tool between the wheel rim and tire bead.

Figure 3:
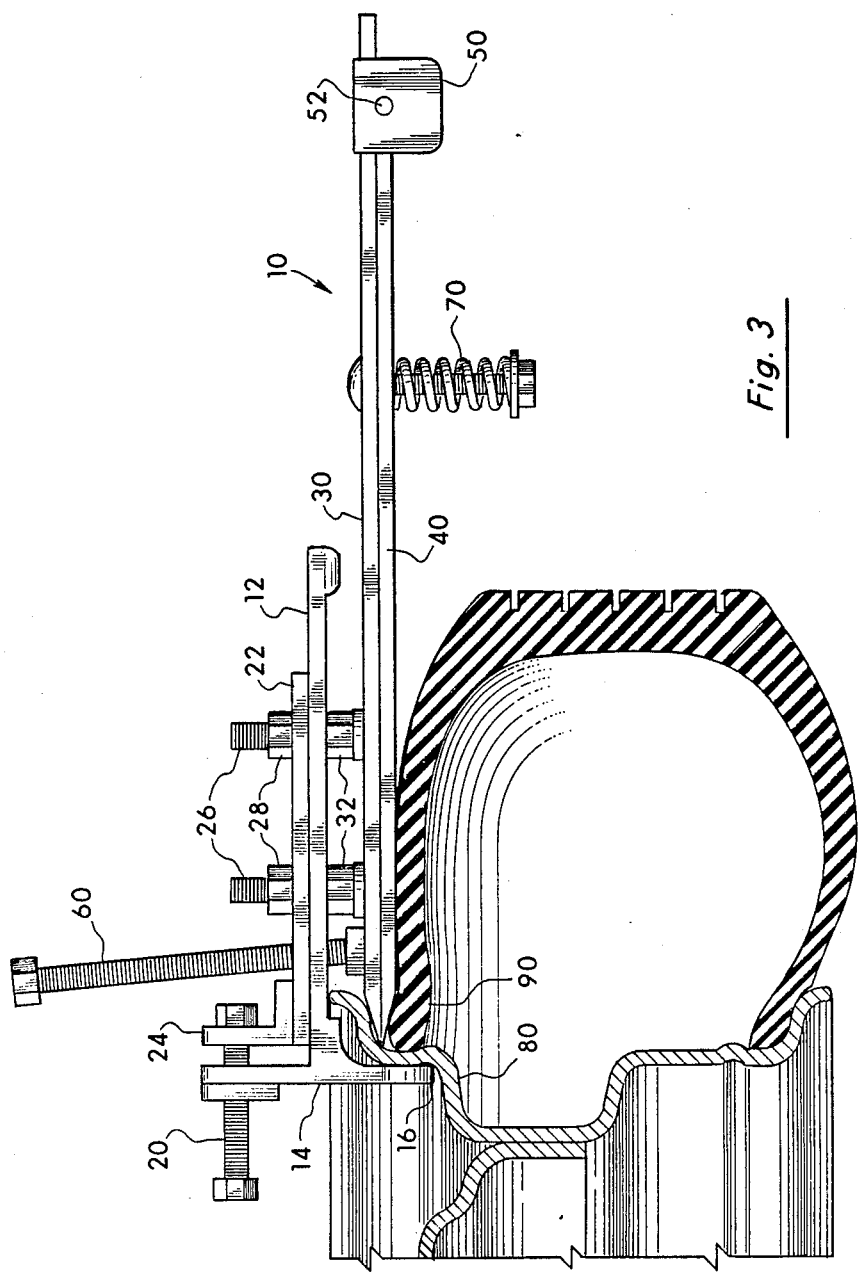
FIG. 3 is a side view of the tool with the tire and wheel rim in cross-section, showing initial insertion of the arms of the tool being inserted between the tire and the wheel rim.

It should be noted that adjustment of the engagement bolt 20 controlling the relative position of the sliding member 22 with respect to the frame 12, also adjusts the relative positions of the parallel arm 30 and the hinged arm 40 with respect to the retaining segment 16. In particular, the relative positions of the parallel arm 30 and the hinged arm 40 with respect to the retaining segment 16 can be adjusted between two states. The first state is a disengaged state in which the distance between said retaining segment and the adjacent ends 32 and 42 of these arms 30 and 40 is greater than the radial dimension of the annular retaining flange of the wheel rim 80. This state permits the tool to be initially positioned with respect to the wheel rim 80 and tire 90. The retaining segment 16 is seated against a portion of the inner edge of the annular retailing flange and the frame 12 extends radially outward with respect to the tire. The second state is an engaged state in which the distance between the retailing segment 16 and the adjacent ends 32 and 42 of the parallel arm 30 and the hinged arm 40 is reduced, thereby causing the ends 32 and 42 to be inserted between the tire bead 90 and the interior surface of said wheel rim 80, as shown in FIG. 3.

Figure 4:
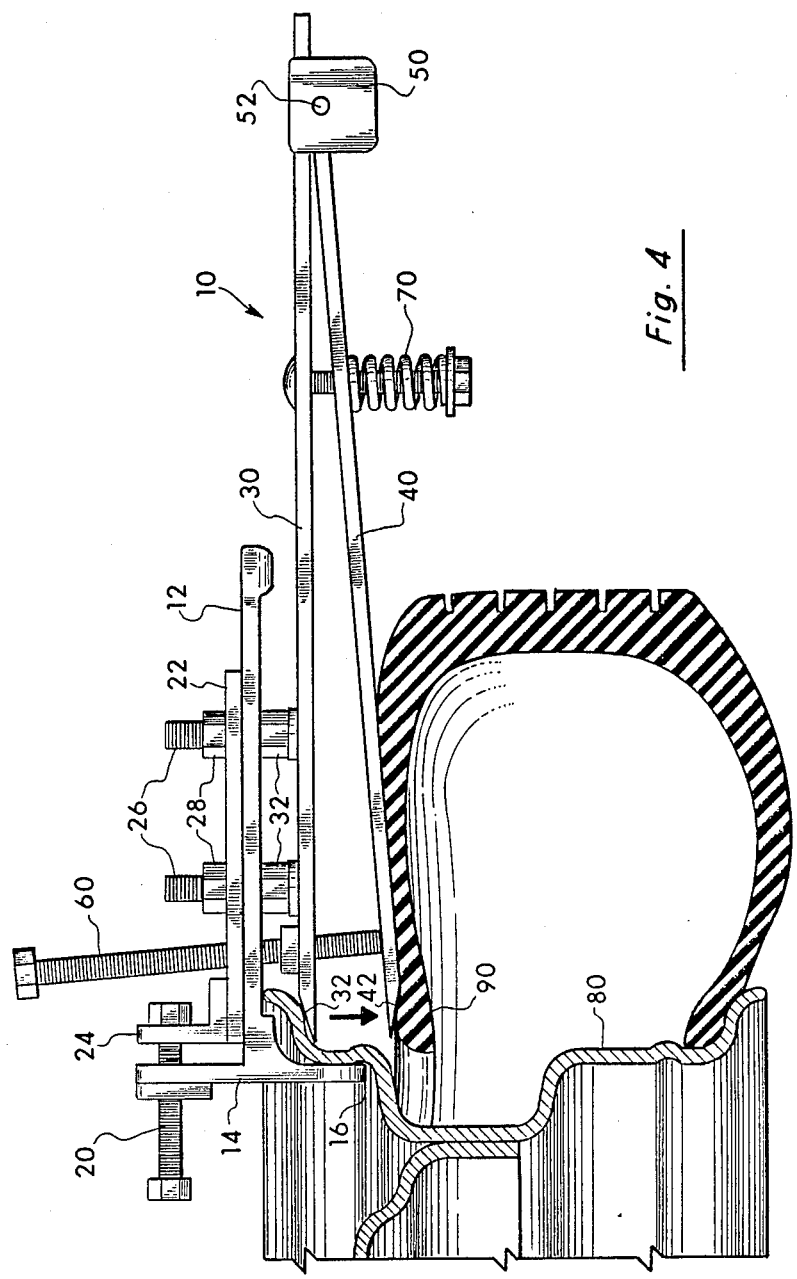
FIG. 4 is a side view corresponding to FIG. 3, showing the tool as the arms of the tool are separated and the tire bead is broken away from the wheel rim.

A threaded bolt 60 serves as an actuating means for pivotally adjusting the relative positions of the hinged arm 40 with respect to the parallel arm 30. Once again, two states are involved. The first, closed state is shown in FIG. 3. The ends 32 and 42 of the parallel arm 30 and the hinged arm 40 adjacent to the retaining segment 16 remain in contact with one another. The second, opened state is shown in FIG. 4. The ends 32 and 42 are moved apart by pivoting the hinged arm 40 away from the parallel arm 30, thereby separating the tire bead 90 from the interior surface of said wheel rim 80.

In the preferred embodiment, the actuating bolt 60 extends in a direction substantially perpendicular to the parallel arm 30. The actuating bolt passes freely through a hole in the sliding member 22 and the slot 18 in the stem of the frame 12. The bolt 60 is threaded through the parallel arm, with the end of the bolt abutting a recessed indentation 44 on the top surface of the hinged arm 40. The actuating bolt 60 may extend at an acute angle (slightly less than 90 degrees) with respect to that portion of the item segment of the frame 12 adjacent to the engagement segment 14, to minimize binding as the hinged arm 40 rotates with respect to the parallel arm 30.

A spring mechanism 70 applies a biasing force which tends to keep the parallel arm 30 and the hinged arm 40 in the closed state. This simplifies initial engagement of the tool with respect to the tire and wheel rim, by preventing unnecessary motion of the hinged arm during this step.

Operation of the tool may be better understood by a step-by-step explanation of the process of separating a tire from a wheel rim. The first step is to deflate the tire to facilitate initial engagement of the tool with the tire and wheel rim. This can be achieved in a conventional manner by removing the valve core from the valve stem of the tire. Deflation of the tire eliminates internal pressure which tends to cause the side wall of the tire to bulge laterally outward beyond the rim of the wheel. After the tire has been deflated, the side wall of the tire can easily be pushed laterally inward by the tool to be even with the wheel rim. However, the tire bead remains attached to the wheel rim, until it is separated as discussed in the following steps.

The next step is to configure the tool for initial engagement with the tire and wheel rim. The actuating bolt 60 is loosened until the hinged arm 40 and the parallel arm 30 contact one another, and are in the closed state as discussed above. The engagement bolt 20 is loosened to the disengaged state, as previously discussed, so that the spacing between the retaining segment 16 and the adjacent ends 32 and 42 of the arms 30 and 40 is sufficiently great to allow the tool to slip over the annular flange of the wheel rim 80. The second step is to place the tool in its initial position with respect to the wheel rim and tire. The retaining segment 16 is seated against the inner edge of this annular flange. The adjacent ends 32 and 42 of the arms 30 and 40 are positioned between the outer edge of the wheel rim flange and the side wall of the tire. If necessary, the spacing between the stem segment of the frame 12 and parallel arm 30 can be adjusted by means of the adjustment nuts 32 and 28 on the connector bolts 26, to accommodate different types and sizes of wheel flanges.

The third step is to tighten the engagement bolt to draw the adjacent ends 32 and 42 between the interior surface of the wheel rim 80 and the tire bead 90. This corresponds to the engaged state described above and shown in FIG. 3. Tightening of the engagement bolt 20 causes the sliding member 22 to slide with respect to the frame 12 toward the engagement segment 14. Due to the fact the parallel arm 30 and hinged arm 40 are connected to the sliding member 22 by means of the connector bolts 26, this movement of the sliding member 22 causes the adjacent ends 32 and 42 to move toward the retaining segment 16. During this engagement process, the wheel rim is effectively held in place between the retaining segment 16 and the adjacent ends 32 and 42 of the arms 30 and 40. As the engagement bolt 20 is tightened, these adjacent ends follow the contour of the interior surface of the wheel rim flange 80 as they are drawn radially inward with respect to the wheel rim.

The next step is to tighten the actuating bolt 60 to push the wall of the tire 90 away from the interior surface of the wheel rim flange 80. This corresponds to the opened state described above and shown in FIG. 4. As the actuating bolt 60 is tightened, a force is exerted between the parallel arm 30 and the hinged arm 40 which causes rotation of the hinged arm 40 away from the parallel arm 30 about the hinge pin 52. The spring mechanism 70 is also compressed as the hinged arm 40 rotates. This movement of the hinged arm 40 pushes the tire wall and bead away from the wheel rim flange as shown in FIG. 4.

Many wheel rims incorporate an added raised rim, or "safety bead", extending around the circumference of the wheel 80 at a short distance laterally inward from the wheel rim flange. This safety bead acts as a retaining flange, and is intended to lessen the disk of the tire inadvertently separating from the wheeling the event the tire is accidentally deflated. This safety flange is shown in FIGS. 3 and 4, immediately adjacent to the retaining segment 16 of the tool. When dealing with a wheel rim having such a safety bead, the hinged arm 40 must push the tire wall sufficiently inward, so that the tire bead is forced over the safety bead, as shown in FIG. 4.

The process described above can be repeated if necessary, at additional locations along the wheel rim. The tire can then be easily removed from the wheel rim.

The engagement bolt 20, actuating bolt 60, and connector bolts 26 can all be operated manually by means of a conventional wrench. Thus, no power tools or external power supplies are required for operation of the tool.

Figure 5:
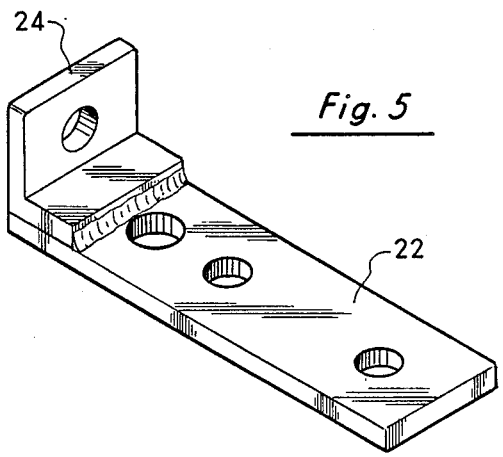
FIG. 5 is a perspective view of the sliding member of the tool.
Figure 9:
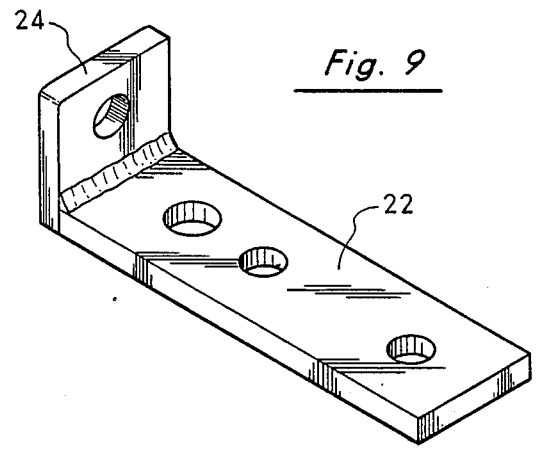
FIG. 9 is a perspective view of an alternative embodiment of the sliding member shown in FIG. 5

FIG. 9 shows a simplified alternative embodiment of the sliding member 22 in which the piece of angle iron used to form the foot 24 of the sliding member shown in FIG. 5 has been replaced with a flat plate that is simply welded to the remainder of the sliding member.

Figure 6:
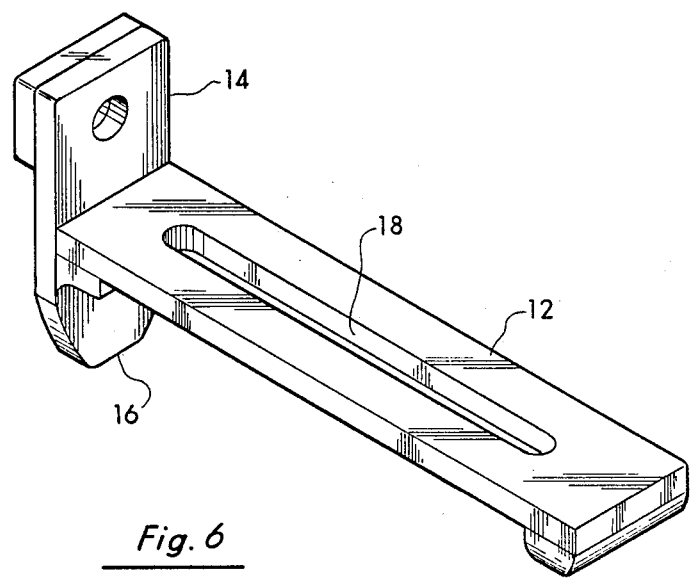
FIG. 6 is a perspective view of the frame of the tool, including the retaining segment and the engagement segment.
Figure 10:
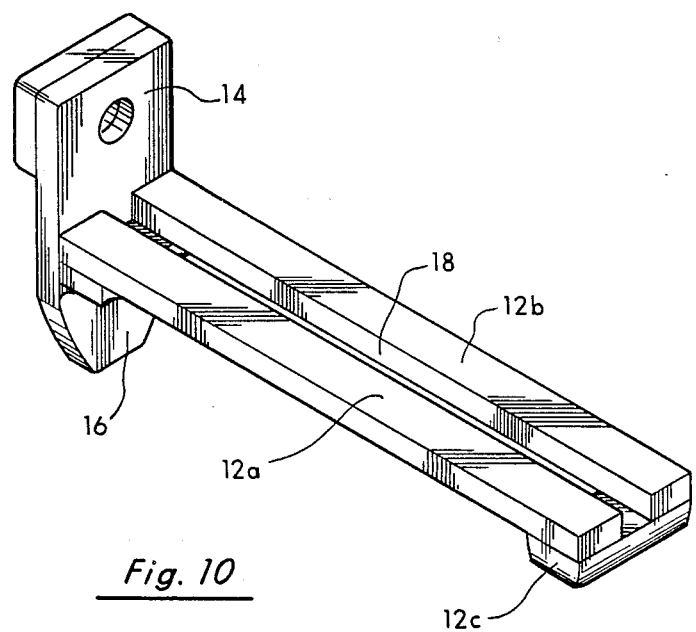
FIG. 10 is a perspective view of an alternative embodiment of the frame of the tool, similar to FIG. 6.

FIG. 10 is an alternative embodiment of the frame 12 of the tool shown in FIG. 6. The slot 18 extending along a portion of the stem segment of the frame 12 can be formed by any number of means. The embodiment shown in FIG. 6 assumes this slot is formed either by the mold used to form the frame, or by subsequent machining of the frame. The alternative embodiment of the frame 12 shown in FIG. 10 uses two parallel strips 12a and 12b to form the stem segment of the frame and the slot 18. These strips are welded to two small cross segments 12c and 12d to form a rigid rectangular structure.

The above disclosure sets forth a number of embodiments of the present invention. Other arrangements or embodiments, not precisely set forth, could be practiced under the teachings of the present invention and as set forth in the following claims.

I claim:

1. A tire bead breaking tool for use in connection with a wheel rim having an annular retaining flange with an interior tire bead bearing surface and an opposite exterior surface, and a tire installed on said wheel rim having a side wall terminating in a bead situated adjacent and in a sealing relationship to said interior surface, said tool comprising:

(a) an elongated frame member;

(b) a retaining segment extending substantially perpendicular to said frame;

(c) a sliding member extending parallel to said frame, adapted for sliding engagement along a portion of said frame;

(d) a parallel arm having two ends, said parallel arm extending parallel to said frame at a predetermined distance from said frame in a plane defined by said frame and said retaining segment, and connected to said sliding member so as to translate parallel to said frame with said sliding member;

(e) a hinged arm having two ends, with one end pivotally attached to the end of the parallel arm distal from said retaining segment, and adapted to pivot about said end in a plane defined by said frame and said retaining segment;

(f) engagement means for adjusting the relative position of said sliding member with respect to said frame, thereby also adjusting the relative positions of said parallel arm and said hinged arm with respect to said retaining segment between: (1) a disengaged state, in which the distance between said retaining segment and the adjacent ends of said parallel arm and said hinged arm is greater than the radial dimension of the annular retaining flange of said wheel rim, so as to permit the tool to be initially positioned with respect to said wheel rim and tire, with said retaining segment seated against a portion of the inner edge of said annular retaining flange and said frame extending radially outward with respect to said tire; and (2) an engaged state, in which the distance between said retaining segment and the adjacent ends of said parallel arm and said hinged arm is reduced, thereby causing said adjacent ends to be inserted between said tire bead and the interior surface of said wheel rim; and (g) actuating means for pivotally adjusting the relative positions during said engaged state of said hinged arm with respect to said parallel arm between: (1) a closed state, in which he ends of the parallel arm and the hinged arm adjacent to said retaining segment contact one another to facilitate initial insertion of said adjacent ends between the interior surface of said wheel rim and said tire bead; and (2) an opened state, in which said ends of the parallel arm and the hinged arm are moved apart by pivoting said hinged arm with respect to said parallel arm, thereby separating the tire bead from the interior surface of said wheel rim.

2. The tool of claim 2, wherein said actuating means comprises a threaded bolt which passes freely through holes in said sliding member and in said frame, is threaded through said parallel arm, and the end of which abuts said hinged arm; thereby applying a separating force for pivoting said hinged arm with respect to said parallel arm as said bolt is rotated.

3. The tool of claim 2, wherein said actuating bolt extends at an acute angle with respect to that portion of said stem segment of the frame adjacent to said engagement segment.

4. The tool of claim 1, wherein said engagement means comprises a threaded bolt extending parallel to said frame through said retaining segment and a portion of said frame.

5. The tool of claim 1, further comprising spring means applying a biasing force which tends to hold the hinged arm in said closed state against said parallel arm.

6. The tool of claim 1, wherein the ends of said hinged arm and said parallel arm adjacent to said retaining segment have tapered tips facilitating initial insertion of said ends between the interior surface of said wheel rim and said tire bead.

7. A tire bead breaking tool for use in connection with a wheel rim having an annular retaining flange with an interior tire bead bearing surface and an opposite exterior surface, and a tire installed on said wheel rim having a side wall terminating in a bead situated adjacent and in a sealing relationship to said interior surface, said tool comprising:

(a) a T-shaped frame having a stem segment and two cross segments perpendicular to said stem segment; said stem segment having a slot through said stem segment in a direction parallel to said cross segments, extending axially along a portion of the length of said stem segment;

(b) a retaining segment formed from one of said cross segments;

(c) an engagement member formed from the other cross segment;

(d) an L-shaped sliding member having a stem segment and a foot segment perpendicular to said stem segment & said sliding member; said stem segment extending parallel to said frame, adapted for sliding engagement along a portion of the stem segment of said frame opposite from said retaining segment; said foot segment extending parallel and adjacent to said engagement member;

(e) a parallel arm having two ends, said parallel arm extending parallel to said stem segment of the frame at a predetermined distance from said stem segment in a plane defined by said stem segment and said retaining segment;

(f) at least one connector extending through said slot in the stem segment of the frame, connecting said parallel arm to said sliding member; whereby any sliding motion of said sliding member with respect to said stem segment of the frame also causes a corresponding parallel translation of said parallel arm with respect to said stem segment of the frame;

(g) a hinged arm having two ends, with one end pivotally attached to the end of the parallel arm distal from said retaining segment, and adapted to pivot about said end in a plane defined by said stem segment and said retaining segment;

(h) an engagement bolt extending parallel to said stem segment of the frame, in threaded engagement between said engagement member of the frame and said foot of the sliding member, suitable for adjusting the relative position of said sliding member with respect to said frame, thereby also adjusting the relative positions of said parallel arm and said hinged arm with respect to said retaining segment between: (1) a disengaged state, in which the distance between said retaining segment and the adjacent ends of said parallel arm and said hinged arm is greater than the radial dimension of the annular retaining flange of said wheel rim, so as to permit the tool to be initially positioned with respect to said wheel rim and tire, with said retaining segment seated against a portion of the inner edge of said annular retaining flange and said frame extending radially outward with respect to said tire; and (2) an engaged state, in which the distance between said retaining segment and the adjacent ends of said parallel arm and said hinged arm is reduced, thereby causing said adjacent ends to be inserted between said tire bead and the interior surface of said wheel rim; and (i) an actuating bolt which passes freely through a hole in said sliding member and a said slot in said frame, and which is threaded through said parallel arm, the end of which abuts said hinged arm; thereby providing means for pivotally adjusting the relative position during said engaged state of said hinged arm with respect to said parallel arm between: (1) a closed state, in which the ends of the parallel arm and the hinged arm adjacent to said retaining segment contact one another to facilitate initial insertion of said adjacent ends between the interior surface of said wheel rim and said tire bead; and (2) an opened state, in which said ends of the parallel arm and the hinged arm are moved apart by pivoting said hinged arm with respect to said parallel arm, thereby separating the tire bead from the interior surface of said wheel rim.

8. The tool of claim 7, wherein said actuating bolt extends at an acute angle with respect to that portion of the stem segment of said frame adjacent to said engagement segment.

9. The tool of claim 7, further comprising spring means applying a biasing force which tends to hold the hinged arm in said closed state against said parallel arm.

10. The tool of claim 7, wherein the ends of said hinged arm and said parallel arm adjacent to said retaining segment have tapered tips facilitating initial insertion of said ends between the interior surface of said wheel rim and said tire bead.

11. A tire bead breaking tool for use in connection with a wheel rim having an annular retaining flange with an interior tire bead bearing surface and an opposite exterior surface, and a tire installed on said wheel rim having a side wall terminating in a bead situated adjacent and in a sealing relationship to said interior surface, said tool comprising:

(a) a T-shaped frame having a stem segment and two cross segments perpendicular to said stem segment; said stem segment having a slot through said stem segment in a direction parallel to said cross segments, extending axially along a portion of the length of said stem segment;

(b) a retaining segment formed from one of said cross segments;

(c) an engagement member formed from the other cross segment;

(d) an L-shaped sliding member having a stem segment & said sliding member and a foot segment perpendicular to said stem segment; said stem segment extending parallel to said frame, adapted for sliding engagement along a portion of the stem segment of said frame opposite from said retaining segment; said foot segment extending parallel and adjacent to said engagement member;

(e) a parallel arm having two ends, said parallel arm extending parallel to said stem segment of the frame at a distance from said stem segment, opposite from said sliding member, in a plane defined by said stem segment and said retaining segment;

(f) at least one connector bolt extending through said slot in the stem segment of the frame, connecting said parallel arm to said sliding member; whereby any sliding motion of said sliding member with respect to said stem segment of the frame also causes a corresponding parallel translation of said parallel arm with respect to said stem segment of the frame; the distance between said parallel arm and said sliding member being adjustable by means of said connector bolt;

(g) a hinged arm having two ends, with one end pivotally attached to the end of the parallel arm distal from said retaining segment, and adapted to pivot about said end in a plane defined by said frame and said retaining segment;

(h) an engagement bolt extending parallel to said stem segment of the frame, in threaded engagement between said engagement member of the frame and said foot of the sliding member, suitable for adjusting the relative position of said sliding member with respect to said frame, thereby also adjusting the relative positions of said parallel arm and said hinged arm with respect to said retaining segment between: (1) a disengaged state, in which the distance between said retaining segment and the adjacent ends of said parallel arm and said hinged arm is greater than the radial dimension of the annular retaining flange of said wheel rim, so as to permit the tool to be initially positioned with respect to said wheel rim and tire, with said retaining segment seated against a portion of the inner edge of said annular retaining flange and said frame extending radially outward with respect to said tire; and (2) an engaged state, in which the distance between said retaining segment and the adjacent ends of said parallel arm and said hinged arm is reduced, thereby causing said adjacent ends to be inserted between said tire bead and the interior surface of said wheel rim; and (i) an actuating bolt, extending at an acute angle with respect to that portion of the stem segment of said frame adjacent to said engagement segment, threaded through said sliding member, which passes freely through said slot in said frame and a hole in said parallel arm, the end of which abuts said hinged arm; thereby providing means for pivotally adjusting the relative position during said engaged state of said hinged arm with respect to said parallel arm between: (1) a closed state, in which the ends of the parallel arm and the hinged arm adjacent to said retaining segment contact one another to facilitate initial insertion of said adjacent ends between the interior surface of said wheel rim and said tire bead; and (2) an opened state, in which said ends of the parallel arm and the hinged arm are moved apart by pivoting said hinged arm with respect to said parallel arm, thereby separating the tire bead from the interior surface of said wheel rim;

(j) spring means applying a biasing force which tends to hold the hinged arm in said closed state against said parallel arm.

* * * * *